Sept. 1, 1925.
W. L. GUY
CONTROL LEVER
Filed March 9, 1925
1,551,823
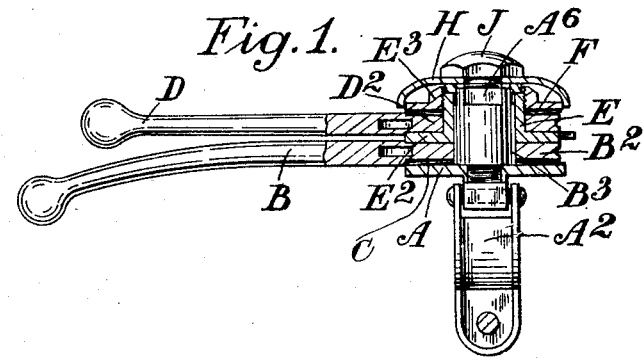
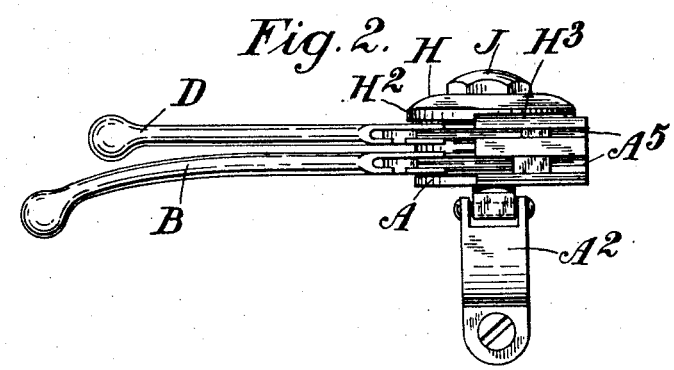
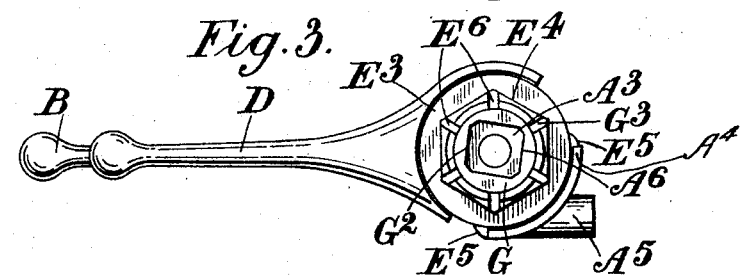
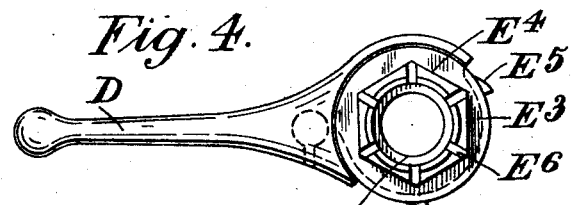
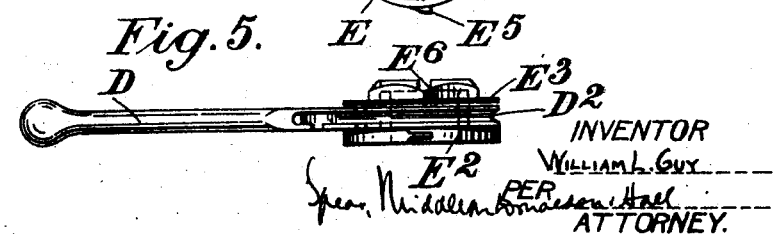
INVENTOR
William L. Guy
PER
ATTORNEY.

Patented Sept. 1, 1925.

1,551,823

UNITED STATES PATENT OFFICE.

WILLIAM LESLIE GUY, OF BIRMINGHAM, ENGLAND, ASSIGNOR TO AMAC LIMITED, OF BIRMINGHAM, ENGLAND, A BRITISH COMPANY.

CONTROL LEVER.

Application filed March 9, 1925. Serial No. 14,146.

*To all whom it may concern:*

Be it known that I, WILLIAM LESLIE GUY, a subject of the King of England, residing at Birmingham, England, have invented certain new and useful Improvements in Control Levers, of which the following is a specification.

This invention relates to Bowden wire control levers, such as are usually clipped to the handlebars of motor cycles, of the kind in which the hubs of one or more levers are coaxially mounted upon a fixed base, and an adjustable friction device grips the hubs to prevent uncontrolled movement of the levers.

The object of the invention is to provide a form of adjustment which will enable the friction of each lever to be adjusted independently and in a simple manner.

In the accompanying drawings, which show a construction having two levers only,

Figure 1 is a sectional elevation of the mechanism,

Figure 2 is a similar view wholly in outside elevation,

Figure 3 is a plan view of Figure 2 with the cap of the mechanism removed,

Figure 4 is a plan view of the upper lever only with its associated reel, and

Figure 5 is an elevation of Figure 4.

In carrying out the invention, the base A may be of any usual form, preferably circular with clips $A^2$ or equivalent attachment devices and a central stud $A^3$ extending from it. The lower part of this stud is of circular form to agree with the central hole $B^3$ of the hub $B^2$ of the first lever B, the hub lying against the base A and preferably having a spring washer C of the known Belleville type between it and the base, or upon its upper side. As usual the washer may engage an annular groove in the base or the hub.

The second lever D is rotatably mounted upon a reel constituted by a sleeve-form hub E, a fixed flange $E^2$ at one end thereof, and an adjustable flange $E^3$ at the other end, the adjustable flange being screw-threaded upon the hub E and having a hexagonal or other non-circular part $E^4$ for adjusting it. A Belleville washer F is also provided between the hub $D^2$ of the second lever and one or both of the flanges $E^2$, $E^3$ of the reel. The central hole through the reel is either non-circular and slidably engages a non-circular part of the stud $A^3$ upon the base A, or other means are adopted to hold it angularly fast on the stud, so that when mounted thereon with its fixed flange towards the hub $B^2$ of the first lever B, it can be used to compress the latter against the base. In the construction illustrated (see Figures 3 and 4) projections $E^5$ engage the ends of a wall $A^4$ partly surrounding the base A and having fixed to it the bosses $A^5$ in which the ends of the transmission cables (not shown) engage.

The adjustable flange $E^3$ of the reel is provided with a locking device which preferably is adapted to give a vernier adjustment and, as here illustrated (see Figures 3 and 4) comprises a washer G, having a square hole $G^2$ engaging in selective angular positions a corresponding square portion $A^6$ of the stud A and having one or more radially arranged tongues $G^3$ adapted to engage castellations $E^6$ in the adjustable flange $E^3$ of the reel, preferably the hexagonal part $E^4$ by means of which it is rotated. If the number of castellations differs from the number of angular positions of the washer a vernier adjustment can be obtained.

A cap H resembling an inverted saucer is mounted over the reel and retained by a set screw J tapped into the end of the stud A. The depending flange $H^2$ of the cap is cut away so that the ends $H^3$ of the notch engage the ends of the wall $A^4$ and prevent its movement around the stud A. This cap H bears upon the reel so that by means of the set screw J, the reel can be compressed against the hub of the first lever B, thrusting it against the base A, thereby to impart to the lever the necessary frictional resistance to movement. Sufficient vertical clearance of the cap H from the wall $A^4$ and the stud $A^3$ is provided for this adjustment, and preferably some means are provided for locking the set screw J, by means of which the cap H and both the levers are retained upon the central stud.

The foregoing arrangement has the advantage that the adjustment of the frictional load on the levers can be very readily effected by means of the set screw J.

It is to be understood that the invention is in no way restricted to the use of two levers, as it will be readily apparent from the foregoing that, by an extension of the method adopted for two only, three or more could be mounted so as to be independently adjustable as to their frictional resistance to motion.

It will be evident from the foregoing that the invention is carried out in a very simple manner, and that the assembly and subsequent adjustment of the several parts can be readily effected.

What I claim as my invention and desire to secure by Letters Patent of the United States is:—

1. A control lever assembly comprising a base, a central stud extending therefrom, a lever mounted upon said stud, a reel fixed against rotation and mounted upon said stud, said reel having relatively adjustable flanges, a second lever carried by the said flanges, and means to compress the first mentioned lever toward the base.

2. The device of claim 1, said reel comprising a hub of sleeve form having a fixed radial flange at one end, and an adjustable flange screw threaded upon the other end, said reel being loosely mounted upon said stud and having a projection at the edge of its fixed flange engaging a fixed part carried by the base, the adjustable flange being locked by indirect engagement with a non-circular portion of said stud.

3. The device of claim 1, in which the reel upon which said second lever is mounted has separate adjustments for frictional pressure and is mounted upon and secured to said stud by means of a locking device, which device thrusts said lever bodily against the first mentioned lever.

4. A control lever assembly comprising a base, means to attach said base to a handle bar, a vertical stud extending from the base, a lever loosely mounted upon said stud, a reel mounted upon said stud and being provided with relatively adjustable flanges, a second lever carried by the said flanges, a cap adjustably engaging said reel thereby to compress the first mentioned lever between it and the base.

5. In combination in a control lever assembly, a base, means to attach said base to a handle bar, a stud secured to said base, a lever mounted on said base and in contact with said stud, a tubular member telescopically engaging said stud, and having a peripheral flange, said tubular element being nonrotatably mounted on said stud, and means to bodily adjust the flange of the tubular element against said lever.

6. The device of claim 5, and an adjustable flange on said tubular element above said second lever, a lever resting on said flange, and a second adjustable flange nonrotatably mounted on said stud and engaging the top of said last mentioned lever.

7. The device of claim 5, said tubular element having a fixed peripheral flange and an adjustable peripheral flange screw threaded thereto, said tubular element having an angular aperture therein engaging a similarly shaped portion of the stud, and projections at the end of the fixed flange, cooperating with fixed parts on said base.

In testimony whereof I have signed my name to this specification.

WILLIAM LESLIE GUY.